Aug. 15, 1950     M. H. TINKER     2,518,959
APPARATUS FOR TESTING THE CRUSH STRENGTH OF PAPER

Filed July 21, 1948

INVENTOR.
Malcolm H. Tinker.
BY
Ross & Ross
Attys.

Patented Aug. 15, 1950

2,518,959

UNITED STATES PATENT OFFICE 2,518,959

APPARATUS FOR TESTING THE CRUSH STRENGTH OF PAPER

Malcolm H. Tinker, Holyoke, Mass., assignor to B. F. Perkins & Son, Inc., Holyoke, Mass., a corporation of Massachusetts Application July 21, 1948, Serial No. 39,879

2 Claims. (Cl. 73—94)

1

This invention relates to improvements in testing machines and is directed more particularly to improvements in machines for testing web material in strip form.

The principal object of the invention is directed to the provision of a testing machine for material in strip form. The novel features of the machine adapt it for testing various materials but it is particularly adapted for testing fibrous material such as cardboard, paper and the like.

Figure 1:
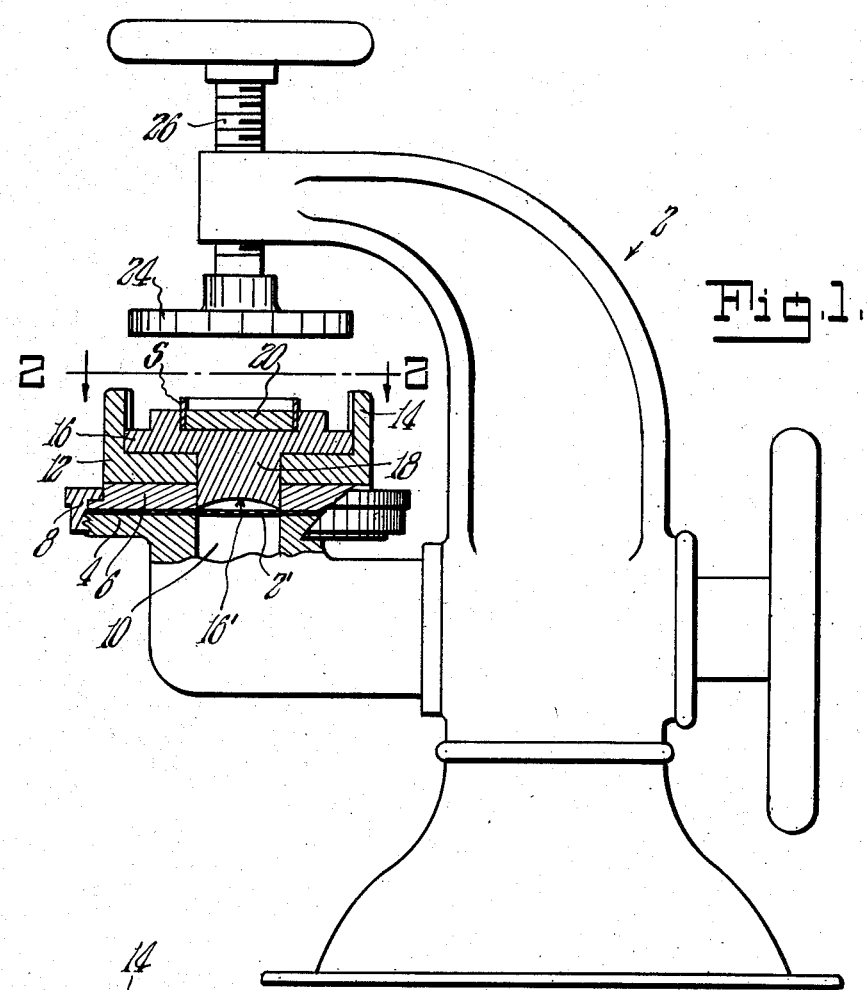
Figure 2:
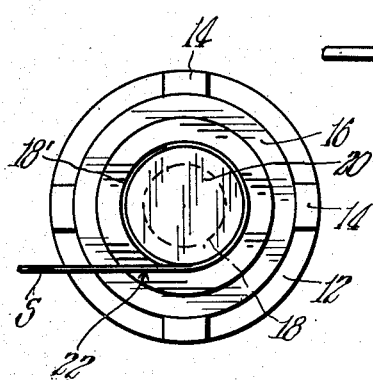

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Fig. 1 is a side elevational view of a testing machine with the novel combination and arrangement of parts constituting the invention shown in section; and Fig. 2 is a plan view on the line 2—2 of Fig. 1.

Referring now to the drawings more in detail, the invention will be fully described.

A testing machine is represented by 2 in Fig. 1 which is of the type shown and described in United States Patent No. 1,758,688 of May 13, 1930.

As with the machine of said patent, a frame 2 has a cylinder for liquid in which a piston is reciprocated by a handwheel so that liquid in the cylinder is caused to distend a flexible diaphragm.

A diaphragm 2' is clamped to a platform 4 by a plate 6 and a ring 8 which threadedly engages the platform 4. The diaphragm is preferably made from rubber or rubber-like material.

A passageway 10 leads from the cylinder referred to.

A guide plate 12 is provided which rests on member 6 and it has a plurality of upstanding guides 14.

A specimen support 16 has a central post 18 which fits somewhat loosely in bores provided in members 6 and 12 and the periphery of support 16 fits loosely in guide portions 14 so that said support may move up and down.

The lower face 16' of the post is disposed over the diaphragm.

A circular depression 18' is provided in the upper side of the support and a disc 20 is provided which is of a diameter smaller than that of the depression to provide an annular space between the disc and depression as shown to receive a strip S of material to be tested.

There may be a plurality of discs such as 20 to provide spaces or grooves of different widths for specimens of different thicknesses.

A slot 22 tangential to the recess leads thereinto so that a specimen in the form of a strip may be pushed therethrough into the groove between the member 20 and recess and assume a tubular shape as in Fig. 1.

In operation, a pressure plate 24 is lowered onto the upper edge of the specimen S by rotation of screw 26. Such pressure as may be desired may be applied to the specimen.

The piston is advanced in the cylinder to displace liquid therein so that it acts on the diaphragm to distend it into engagement with the member 18 and lift the specimen support upwardly thereby to press the specimen against plate 24 so as to crush it.

Depending upon the characteristics of the specimen, it will crush under a certain pressure and by means of the apparatus the ability of different specimens may be determined by reading the pressure of the liquid which may be accomplished by means of a pressure gauge as in the patent referred to.

As stated, there may be members such as 20 of different diameters so that spaces of different widths may be provided for specimens of different thicknesses.

It will be desirable that the parts be arranged so that the lower marginal portion of a specimen be rather snug in the groove so that crushing of the specimen takes place above the members 16 and 20.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A testing machine for applying pressure to a strip of material edgewise comprising in combination, a platform having an opening therethrough for fluid under pressure, a pliable diaphragm over said opening having a central portion adapted to be distended upwardly by fluid under pressure in said opening, means clamping said diaphragm to said platform having an opening therethrough for the distended portion of said diaphragm, a specimen support on said clamping means having a central portion slidable up and down in the opening thereof provided with a lower face adapted to be engaged by said central portion of the diaphragm, holding means on the upper side of said support for positioning a strip of material to be tested edgewise in the form of a cylinder, and a pressure plate above said support against which the upper edge of a specimen may abut as the support is elevated by the distension of said diaphragm, said holding means including a circular depression provided in the upper side of said support and a separate central circular member therein having its periphery spaced from the sides of the depression providing an annular groove for an elongated specimen disposed edgewise, and said support provided with an entrance groove extending tangentially into said depression from a side thereof whereby a strip of material may be inserted on edge longitudinally into and through said entrance groove and into said annular groove.

2. A testing machine for applying pressure to a strip of material edgewise comprising in combination, a platform having an opening therethrough for fluid under pressure, a pliable diaphragm over said opening having a central portion adapted to be distended upwardly by fluid under pressure in said opening, means clamping said diaphragm to said platform having an opening therethrough for the distended portion of said diaphragm, a specimen support on said clamping means having a central portion slidable up and down in the opening thereof provided with a lower face adapted to be engaged by said central portion of the diaphragm, holding means on the upper side of said support for positioning a strip of material to be tested edgewise in the form of a cylinder, a pressure plate above said support against which the upper edge of a specimen may abut as the support is elevated by the distension of said diaphragm, said holding means including a circular depression provided in the upper side of said support and a separate central circular member therein having its periphery spaced from the sides of the depression providing an annular groove for an elongated specimen disposed edgewise, said support provided with an entrance groove extending tangentially into said depression from a side thereof whereby a strip of material may be inserted on edge longitudinally into and through said entrance groove and into said annular groove, and a guide plate disposed between said platform and specimen support provided with a central opening in which the central portion of the specimen support is slidable up and down and provided with circumferentially spaced upwardly extending guides for engaging peripherial portions of said pressure plate.

MALCOLM H. TINKER.

REFERENCES CITED

The following references are of record in the file of this patent:

UNITED STATES PATENTS

| Number | Name | Date |
|---|---|---|
| 924,625 | Putnam | June 8, 1909 |
| 1,445,963 | La Batt et al. | Feb. 20, 1923 |
| 2,224,248 | Blum et al. | Dec. 10, 1940 |
| 2,338,338 | Kieckhefer | June 4, 1944 |